United States Patent
Yang et al.

(10) Patent No.: US 11,863,240 B2
(45) Date of Patent: Jan. 2, 2024

(54) ELECTRONIC DEVICE AND METHOD FOR PERFORMING DESIGNATED FUNCTION ACCORDING TO DISTANCE TO EXTERNAL OBJECT, DETERMINED ON BASIS OF SIGNAL OUTPUT THROUGH ANTENNA

(71) Applicant: Samsung Electronics Co., Ltd., Suwon-si (KR)

(72) Inventors: Dongil Yang, Suwon-si (KR); Seonjun Kim, Suwon-si (KR); Seunghyun Oh, Suwon-si (KR); Hanyeop Lee, Suwon-si (KR); Wonsub Lim, Suwon-si (KR); Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 716 days.

(21) Appl. No.: 16/978,651

(22) PCT Filed: Mar. 5, 2019

(86) PCT No.: PCT/KR2019/002501
§ 371 (c)(1),
(2) Date: Sep. 4, 2020

(87) PCT Pub. No.: WO2019/172599
PCT Pub. Date: Sep. 12, 2019

(65) Prior Publication Data
US 2020/0412460 A1 Dec. 31, 2020

(30) Foreign Application Priority Data
Mar. 5, 2018 (KR) .......... 10-2018-0026022

(51) Int. Cl.
  H04B 17/10 (2015.01)
  H04B 17/12 (2015.01)
  H04B 1/401 (2015.01)

(52) U.S. Cl.
  CPC .......... *H04B 17/103* (2015.01); *H04B 1/401* (2013.01); *H04B 17/10* (2015.01); *H04B 17/102* (2015.01); *H04B 17/12* (2015.01)

(58) Field of Classification Search
  CPC .... H04B 17/103; H04B 17/102; H04B 17/12; H04B 1/401; H04B 17/10
  (Continued)

(56) References Cited

U.S. PATENT DOCUMENTS

| 3,981,011 A | 9/1976 | Bell, III |
| 4,730,188 A | 3/1988 | Milheiser |

(Continued)

FOREIGN PATENT DOCUMENTS

| EP | 0171433 A1 | 2/1986 |
| EP | 2312490 A1 | 4/2011 |

(Continued)

OTHER PUBLICATIONS

International Search Report and Written Opinion of the International Searching Authority in connection with International Application No. PCT/KR2019/002501 dated Jun. 11, 2019, 21 pages.

*Primary Examiner* — Hai V Tran

(57) ABSTRACT

The electronic device of the present invention may comprise: a first antenna and a second antenna; a communication circuit; and a processor electrically connected to the first antenna, the second antenna, and the communication circuit. The processor is configured to: control the communication circuit such that a first signal is output to the first antenna; acquire a second signal corresponding to the first signal reflected from the first antenna, and a third signal corre- (Continued)

sponding to the first signal output through the first antenna and received by the second antenna; identify a reflection coefficient at which the first signal is reflected from the first antenna, and a transmission coefficient at which the first signal is transmitted to the second antenna; and perform a designated function according to a value corresponding to a distance between the electronic device and an external object.

12 Claims, 10 Drawing Sheets

(58) Field of Classification Search
USPC .......................................................... 343/703
See application file for complete search history.

(56) References Cited

U.S. PATENT DOCUMENTS

| | | | |
|---|---|---|---|
| 6,100,840 A | 8/2000 | Zidek et al. | |
| 6,346,886 B1 | 2/2002 | De La Huerga | |
| 2002/0089448 A1 | 7/2002 | Poliak et al. | |
| 2003/0001726 A1 | 1/2003 | Moore | |
| 2008/0061984 A1 | 3/2008 | Breed et al. | |
| 2008/0129504 A1 | 6/2008 | Killian et al. | |
| 2009/0175499 A1 | 7/2009 | Rosenblatt | |
| 2009/0310506 A1* | 12/2009 | Li | H04B 7/0811 |
| | | | 343/703 |
| 2011/0116404 A1 | 5/2011 | Shimizu | |
| 2014/0206297 A1 | 7/2014 | Schlub et al. | |
| 2015/0004906 A1 | 1/2015 | Iida | |
| 2015/0355251 A1* | 12/2015 | Pascolini | G01R 29/10 |
| | | | 343/703 |
| 2018/0011169 A1 | 1/2018 | Nakayama et al. | |
| 2018/0132192 A1* | 5/2018 | Yang | H04B 7/0404 |
| 2020/0274232 A1* | 8/2020 | Lim | H04B 1/3827 |
| 2020/0389236 A1* | 12/2020 | Son | H04B 17/29 |
| 2021/0376866 A1* | 12/2021 | Lee | H04B 1/3838 |

FOREIGN PATENT DOCUMENTS

| | | |
|---|---|---|
| EP | 2733981 A2 | 5/2014 |
| JP | 2018-008021 A | 1/2018 |
| KR | 10-1576029 B1 | 12/2015 |
| KR | 10-2017-0113135 A | 10/2017 |
| WO | 8503831 A1 | 8/1985 |

* cited by examiner

ELECTRONIC DEVICE AND METHOD FOR PERFORMING DESIGNATED FUNCTION ACCORDING TO DISTANCE TO EXTERNAL OBJECT, DETERMINED ON BASIS OF SIGNAL OUTPUT THROUGH ANTENNA

CROSS-REFERENCE TO RELATED APPLICATIONS

This application is a National Phase Entry of PCT international Application No. PCT/KR2019/002501, which was filed on Mar. 5, 2019, and claims priority to Korean Patent Application No. 10-2018-0026022 filed on Mar. 5, 2018, in the Korean Intellectual Property Office, the contents of which are incorporated herein by reference.

BACKGROUND

1. Field

The disclosure generally relates to an electronic device and a method for providing various functions on the basis of a distance from an object adjacent to the electronic device.

2. Description of the Related Art

Recently, the variety of services and additional functions provided by electronic devices has continually expanded. In order to increase the effective value of electronic devices and meet the various demands of users, communication service providers or electronic device manufacturers are providing a greater variety of functions and competitively developing various services differentiated from those of other companies.

Further, the electronic device has a plurality of components (or elements) to provide various services. For example, the electronic device has a proximity service therein and thus may detect whether a user is approaching through the proximity sensor. In addition, the electronic device may use a plurality of capacitors as a grip sensor. The electronic device may measure the values of the plurality of capacitors configured as the grip sensor and determine whether the user is gripping the electronic device on the basis of a change in the capacitance values.

SUMMARY

An electronic device is required to have a chip capable of tracking a change in the capacitance of an antenna or a metal pattern unit to be used as a grip sensor. Accordingly, the material cost of a portable electronic device may increase. Further, the electronic device may deteriorate the performance of an antenna due to a loading effect and a parasitic component attributable to a connection part with a grip sensor to be used as a grip sensor. In addition, an additional external component for controlling the range within which the grip sensor can operate, for example, a capacitor may be needed and thus the electronic device may lack a mounting space. When a plurality of antennas is used, connection to a ground or coupling with a cap is needed to secure mutual isolation, but sensitivity and a recognition distance of the grip sensor may be deteriorated due to an increase in self capacitance.

Accordingly, the need to recognize the type of an adjacent object and the distance from the object through extraction of parameters (for example, S parameters) between a plurality of antennas without the use of the grip sensor has arisen.

The radiation characteristics of the electronic device vary depending on an operation environment, for example, situations such as in water, on a desk, or on an iron plate. Through detection of the condition, it is possible to appropriately convert antenna impedance or change/divert an antenna pattern.

For the purpose, the disclosure needs to determine a terminal usage environment by measuring S11 of the antenna and S parameters between a plurality of antennas.

Through various embodiments, it is possible to identify an object adjacent to an electronic device and determine a distance from the object.

In accordance with an aspect of the disclosure, an electronic device and a method for identifying an object adjacent to an electronic device or providing various functions on the basis of a distance from the object are provided.

In accordance with an aspect of the disclosure, an electronic device includes: a first antenna and a second antenna; a communication circuit configured to communicate using the first antenna and the second antenna; and a processor electrically connected to the first antenna, the second antenna, and the communication circuit, wherein the processor is configured to control the communication circuit to output a first signal through the first antenna and acquire a second signal obtained through reflection of the first signal from the first antenna and a third signal acquired through reception of the first signal output through the first antenna by the second antenna, identify a reflection coefficient obtained through reflection of the first signal from the first antenna and a transfer coefficient obtained through transmission of the first signal to the second antenna, based at least partially on the second signal and the third signal, and perform a predetermined function according to a value corresponding to a distance between the electronic device and an external object, based at least partially on the reflection coefficient and the transfer coefficient.

In accordance with another aspect of the disclosure, an electronic device includes: a first antenna and a second antenna; a communication circuit including a coupler; and a processor electrically connected to the first and second antennas and the communication module, wherein the processor is configured to output a first signal through the first antenna using the coupler, acquire a second signal reflected through the first antenna and a third signal, obtained by reception of the first signal output through the first antenna, through the second antenna, based on the output first signal, identify a reflection coefficient obtained by reflection of the first signal from the first antenna and a transfer coefficient obtained by transmission of the first signal to the second antenna, based at least partially on the second signal and the third signal, and identify at least one of a type of an external object and a distance from the external object, based at least partially on the reflection coefficient and the transfer coefficient.

In accordance with another aspect of the disclosure, a computer-readable storage medium storing a program including instructions is provided. The instructions is configured to cause, when executed, at least one processor to output a first signal through a first antenna, acquire a second signal obtained by reflection of the first signal from the first antenna and a third signal obtained by reception of the first signal output through the first antenna by the second antenna, identify a reflection coefficient obtained by reflection of the first signal from the first antenna and a transfer coefficient obtained by transmission of the first signal to the second antenna, based at least partially on the second signal and the third signal, and perform a predetermined function according to a value corresponding to a distance between the electronic device and an external object, based at least partially on the reflection coefficient and the transfer coefficient.

An electronic device can extract parameters (for example, S parameters) between a plurality of antennas without using a grip sensor to identify a type of an object adjacent to the electronic device and determine a distance from the object and can determine whether a transmission path including an antenna of a terminal is normal.

Further, the electronic device can identify the type of the object adjacent to the electronic device and provide various functions on the basis of the distance from the object.

In addition, the electronic device can reduce material costs due to obviation of a grip sensor and identify an adjacent object to apply the object to applications (for example, an active UI, a game, a remote sensor, surface-penetrating radar, and a scanner) providing various services.

DETAILED DESCRIPTION

Figure 1:
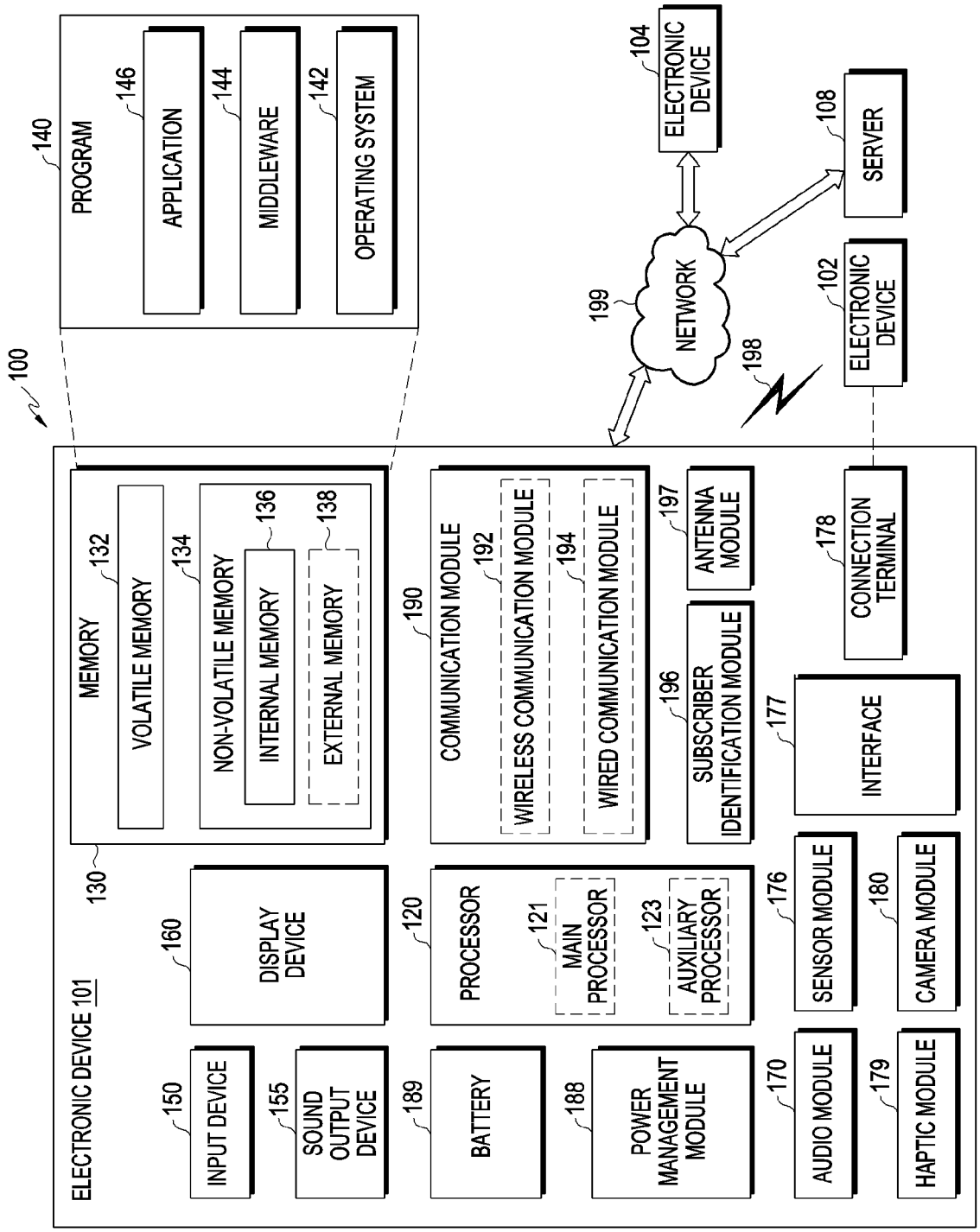
FIG. 1 is a block diagram of an electronic device 101 within a network environment 100 according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented integrated and implemented as in, for example, the sensor module 176 (e.g., a fingerprint sensor, an iris sensor, or an illuminance sensor) embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing and computation. The processor 120 may load and process a command or data received from another component (e.g., the sensor module 176 or the communication module 190) in volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from the main processor 121. Additionally or alternatively, the auxiliary processor 123 may be adapted to consume less power than the main processor 121, or to be specific to a specified function. Here, the auxiliary processor 123 may be operated separately from or embedded in the main processor 121.

In such a case, the auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101, for example, software (e.g., the program 140) and input data or output data for a command related thereto. The memory 130 may include the volatile memory 132 or the non-volatile memory 134.

The program 140 is software stored in the memory 130, and may include, for example, an operating system (OS) 142, middleware 144, or an application 146.

The input device 150 is a device configured to receive a command or data to be used by a component (e.g., the processor 120) of the electronic device 101, from the outside (e.g., a user) of the electronic device 101, and may include, for example, a microphone, a mouse, or a keyboard.

The sound output device 155 is a device configured to output sound signals to the outside of the electronic device 101, and may include, for example, a speaker or a receiver. The speaker may be used for general purposes, such as playing multimedia or playing record, and the receiver may be used only for incoming calls. According to an embodiment, the receiver may be implemented as separate from, or as part of the speaker.

The display device 160 is a device configured to visually provide information to a user of the electronic device 101, and may include, for example, a display, a hologram device, or a projector and control circuitry to control a corresponding one of the display, hologram device, and projector. According to an embodiment, the display device 160 may include touch circuitry or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) wiredly or wirelessly coupled with the electronic device 101.

The sensor module 176 may generate an electrical signal or data value corresponding to an internal operational state (e.g., power or temperature) of the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support specified protocols to be used for the electronic device 101 to be coupled with the external electronic device (e.g., the electronic device 102) wiredly or wirelessly. According to an embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 is a module configured to manage power supplied to the electronic device 101, and may be implemented as at least part of, for example, a power management integrated circuit (PMIC).

The battery 189 is a device configured to supply power to at least one component of the electronic device 101, and may include, for example, a primary cell which is not rechargeable, a secondary cell which is rechargeable, or a fuel cell.

The communication module 190 may support establishing a wired communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules 190 may be implemented as a single chip or may be implemented as separate chips, respectively.

According to an embodiment, the wireless communication module 192 may identify and authenticate the electronic device 101 in a communication network, using user information stored in the subscriber identification module 196.

The antenna module 197 may include at least one antenna module for transmitting or receiving a signal or power to or from the outside of the electronic device 101. According to an embodiment, the communication module 190 (e.g., the wireless communication module 192) may transmit or receive a signal to or from the external electronic device via an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices. According to an embodiment, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the function requested or an additional function, and transfer an outcome of the performing to the electronic device 101. The electronic device 101 may provide the function or service requested, with or without further processing of the outcome. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular expression may include a plural expression, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Such terms as "1st" and "2nd," or "first" and "second" may represent corresponding components regardless of order or importance, may be used to simply distinguish one component from another, and do not limit the corresponding components. When it is described that an element (e.g., a first element) is "(operatively or communicatively) coupled" with/to or "connected" to another element (e.g., a second element), the element can be directly connected to the other element or can be connected to the other element through another element (e.g., a third element).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including an instruction that is stored in a machine-readable storage medium (e.g., internal memory 136 or external memory 138) that is readable by a machine (e.g., a computer). The machine is a device capable of invoking the stored instruction and operating according to the invoked instruction, and may include the electronic device (e.g., the electronic device 101) according to the embodiments set forth herein. When the instruction is executed by the processor (e.g., the processor 120), the processor may perform functions corresponding to the instruction directly, or functions corresponding to the instruction can be performed using other components under the control of the processor. The instruction may include a code generated by a complier or a code executable by an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each component (e.g., a module or a program) according to various embodiments may include a single entity or multiple entities. Some of the above-described sub-components may be omitted, or one or more other components may be added to various embodiments. Alternatively or additionally, some components (e.g., modules or programs) may be integrated into a single entity, and the single entity may still perform one or more functions of each of some components in the same or similar manner as they are performed by a corresponding one of some components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
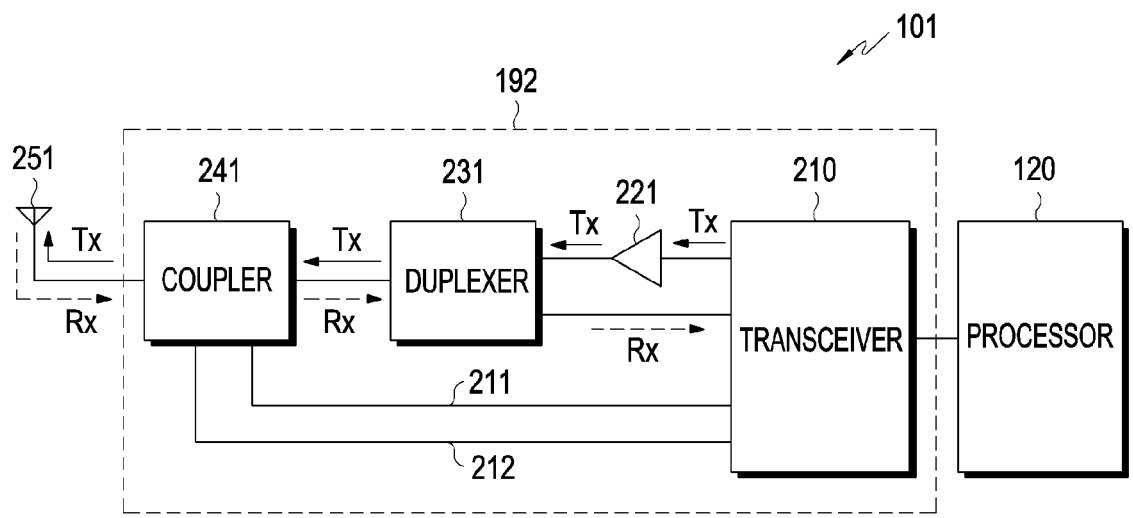
FIG. 2 is a block diagram of an electronic device for calculating a reflection coefficient according to various embodiments.

FIG. 2 is a block diagram of an electronic device for calculating a reflection coefficient according to various embodiments.

Referring to FIG. 2, the electronic device 101 according to various embodiments may include the processor 120, the wireless communication module 192, and an antenna 251. The wireless communication module 192 (or a communication circuit) may include a transceiver 210, a power amplifier 221, a duplexer 231, and a coupler 241.

According to various embodiments, the transceiver 210 may generate a transmission signal. The transceiver 210 may carry a transmission data signal on a carrier and transfer the transmission signal including the transmission data signal and the carrier to the power amplifier 321. The transmission data signal may include data to be transmitted to another electronic device (for example, the electronic device 104) or a Base Station (BS) by the electronic device 101, and may use a fixed particular frequency or a Continuous Wave (CW) signal configured in a single tone in an Industrial Science Medical (ISM) band. The transceiver 210 may include a Band-Pass Filter (BPF) specified for a band to measure a transmission path in order to use a continuous frequency change of a CW signal, or may include a bypass that does not include a filter since a low signal is used. The transmission signal may be transmitted to the outside of the electronic device 101 through the antenna 251 in the form of an electromagnetic wave via the duplexer 231 and the coupler 241. In order to generate the transmission signal, the transceiver 210 may include an oscillator (not shown) for generating a carrier. The transceiver 210 may include a modulation circuit for performing a modulation task to carry the transmission data signal on the carrier generated by the oscillator. The transceiver 210 may include a Radio-Frequency (RF) amplifier for amplifying the modulated carrier in order to increase the strength of the transmission signal.

According to various embodiments, the transceiver 210 may receive a signal (Rx) received through the antenna 251 via the coupler 241 and the duplexer 231. The transceiver 210 may receive a reception signal including a reception data signal and a carrier from the antenna 251 and extract data from the reception signal. The transceiver 210 may transmit the extracted data to the processor 120 or the memory 130. The reception data signal may include data that the electronic device 101 receives from another electronic device 104 or the BS. In order to process the received signal, the transceiver 220 may include a demodulation circuit for performing a demodulation task to extract data from the reception signal.

According to various embodiments, the power amplifier 221 may amplify the transmission signal (Tx) on a transmission side. The power amplifier 221 may receive the transmission signal (Tx) from the transceiver 210, amplify the transmission signal, and transmit the amplified transmission signal to the duplexer 221. The power amplifier 221 and the duplexer 231 may operate differently depending on the frequency band of the transmission signal or a communication scheme. For example, the power amplifier 221 may include a power amplifier of a Multi-Mode Multi-Band (MMMB). The duplexer 231 may include a High-Band (HB) duplexer, a Middle-Band (MB) duplexer, or a Low-Band (LB) duplexer. The power amplifier 221 may receive the transmission signal from the transceiver 210, amplify the received transmission signal, and then transmit the amplified transmission signal to the duplexer 231.

According to various embodiments, the duplexer 231 may branch the transmission signal and the reception signal. The duplexer 231 may separate the transmission signal and the reception signal and filter a transmission frequency and a reception frequency. According to an embodiment, when a signal is transmitted through the antenna 251, the duplexer 231 may pass the transmission signal therethrough. According to another embodiment, when a signal is received through the antenna 231, the duplexer 231 may pass the reception signal therethrough. According to an embodiment, the duplexer 231 may transmit the transmission signal from the transceiver 210 to the antenna 251. According to an embodiment, the duplexer 231 may transmit the reception signal from the antenna 251 to the transceiver 210. The duplexer 231 may receive the transmission signal from the power amplifier 221 and transmit the transmission signal to the antenna 251 via the coupler 241. The duplexer 231 may receive the reception signal from the first antenna 211 via the coupler 241 and transmit the reception signal to the transceiver 210.

According to various embodiments, the coupler 241 may be connected between the antenna 251 and the duplexer 231, and may receive the transmission signal from the duplexer 231 or receive the reception signal from the antenna 251. The coupler 241 may individually detect the transmission signal and the reception signal. According to an embodiment, the coupler 241 may branch a part of the transmission signal transmitted from the duplexer 231 and transmit another part thereof to the transceiver 210. The coupler 241 may distinguish between a signal radiated through the antenna 251 and a signal that is not radiated therethrough but is reflected therefrom among at least one signal output through the duplexer 231 and transfer some of the signals to the transceiver 210. For example, a part of the transmission signal may be fed back to the transceiver 210 (for example, a feedback port) from the coupler 241. According to an embodiment, signals branched through the coupler 241 may include a forward coupling signal 211. The forward coupling signal 211 is a part of the transmission signal and may have the same frequency and phase as the frequency and phase of the transmission signal. According to an embodiment, a strength of the forward coupling signal 211 may be lower than a strength of the transmission signal. The forward coupling signal 211 may be used to calculate a reflection coefficient. According to another embodiment, the coupler 241 may transmit a signal reflected from the antenna 251 to the transceiver 210. For example, the reflected signal may be transmitted to the transceiver 210 (for example, the feedback port) from the coupler 241. According to an embodiment, the signal that is not radiated through the antenna 251 but is reflected from the antenna 251 may include a reverse coupling signal 212. The reverse coupling signal 212 may include a signal reflected from the antenna 251 and a signal received through the antenna 251.

According to various embodiments, the processor 120 may control the transceiver 210, the power amplifier 221, the duplexer 231, the coupler 241, and the antenna 251. The processor 120 may perform the function of the communication module 190. The processor 120 may control the operation of the transceiver 210 for generating a transmission signal. The processor 120 may determine or generate data to be included in the transmission signal and transmit the data to the transceiver 210. The processor 120 may determine a generation scheme of the transmission signal. The transceiver 210 may generate the transmission signal from the data determined or generated by the processor 120 according to the generation scheme determined by the processor 120. For example, when the processor 210 determines that the data is a voice format and the signal generation scheme is Amplitude Modulation (AM), the transceiver 210 may carry the voice data on the carrier in the AM scheme and generate the transmission signal.

According to various embodiments, the processor 120 may determine a phase and a frequency of the transmission signal. The processor 210 may control the transceiver 210 such that the transmission signal has a specific phase and a specific frequency. The processor 120 may determine each of the phase and the frequency of the transmission signal for the antenna 251. The processor 120 may transmit the transmission signal through the antenna 251. The processor 120 may control the transceiver 210 to compensate for the phase of the transmission signal.

According to various embodiments, the processor 120 may transmit a signal through the antenna 251, and some of the signals transmitted through the antenna 251 may be detected as forward coupling signals branched through the coupler 241. According to an embodiment, the forward coupling signal 211 may have the same frequency and phase as those of the transmitted signal. According to an embodiment, the frequency and the phase of the forward coupling signal 211 may be the same as the frequency and the phase of the transmitted signal. According to an embodiment, a strength of the forward coupling signal 211 may be lower than a strength of the transmitted signal. The processor 120 may detect the reverse coupling signal 212 that is not radiated through the antenna 251 but is reflected from the antenna 251. The reverse coupling signal 212 may include a signal received through the antenna 251. According to an embodiment, the processor 120 may calculate a reflection coefficient of the antenna 251 based at least partially on the forward coupling signal 211 or the reverse coupling signal 212 and determine a magnitude, a phase, an I value, and a Q value of a signal corresponding to the calculated reflection coefficient. According to an embodiment, the processor 120 may use the determined reflection coefficient to identify an object type and determine a distance from the object.

The electronic device 101 (for example, the processor 120) according to various embodiments may transmit or receive a signal through the transceiver 210. According to an embodiment, the electronic device 101 (for example, the processor 120) may transmit the transmission signal (Tx) through the transceiver 210, and the transmission signal (Tx) output through the transceiver 210 may be amplified via the power amplifier 221. The transmission signal (Tx) may be transmitted to the coupler 241 via the duplexer 231. According to an embodiment, the duplexer 231 may transmit high-frequency signals transmitted and received through the antenna 251 such that the signals are separately transmitted for the transmission signal and the reception signal according to communication bands thereof. According to an embodiment, the transmission signal (Tx) passing through the coupler 241 may be transmitted to another electronic device through the antenna 251. The coupler 241 may be a bidirectional coupler, and the electronic device 101 may individually detect the forward coupling signal 211 for the transmission signal (Tx) and the reverse coupling signal 212 that is not radiated from the antenna 251 but is reflected therefrom through the coupler 241.

According to various embodiments, the electronic device 101 (for example, the processor 120) may receive the reception signal (Rx) through the antenna 251. The reception signal (Rx) may be transmitted to the duplexer 231 via the coupler 241. According to an embodiment, the reception signal (Rx) transmitted to the duplexer 231 may be transmitted to the transceiver 210. According to an embodiment, the electronic device 101 may detect the signal that is not radiated through the antenna 251 but is reflected therefrom through the coupler 241. According to an embodiment, the electronic device 101 may individually detect a signal (Rx) received through the antenna 251 and a signal that is not radiated through the antenna 251 but is reflected therefrom through the coupler 241. For example, the reverse coupling signal 212 may include the signal (Rx) received through the antenna 251 and the signal reflected from the antenna 251 through the coupler 241.

According to various embodiments, the electronic device 101 (for example, the processor 120) may detect each of the forward coupling signal 211 for the transmission signal (Tx) and the reverse coupling signal 212 for the transmission signal (Tx), which is not radiated through the antenna 251 but is reflected therefrom through the coupler 241. According to various embodiments, the electronic device 101 (for example, the processor 120) may use a reflection coefficient of the antenna 251 based at least partially on the forward coupling signal 211 or the reverse coupling signal 212. According to various embodiments, the electronic device 101 (for example, the processor 120) may determine at least one of a type of an object (or an entity) adjacent to the electronic device 101 or a distance therefrom on the basis of the calculated reflection coefficient. According to various embodiments, the electronic device 101 may switch the antenna 251 to another antenna.

Figure 3:
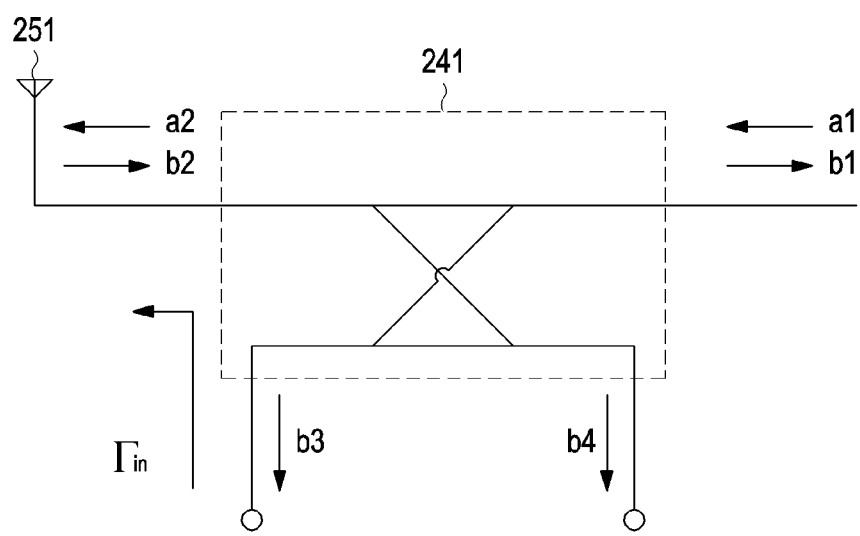
FIG. 3 illustrates an internal structure of a coupler in detail according to various embodiments.
Figure 4:
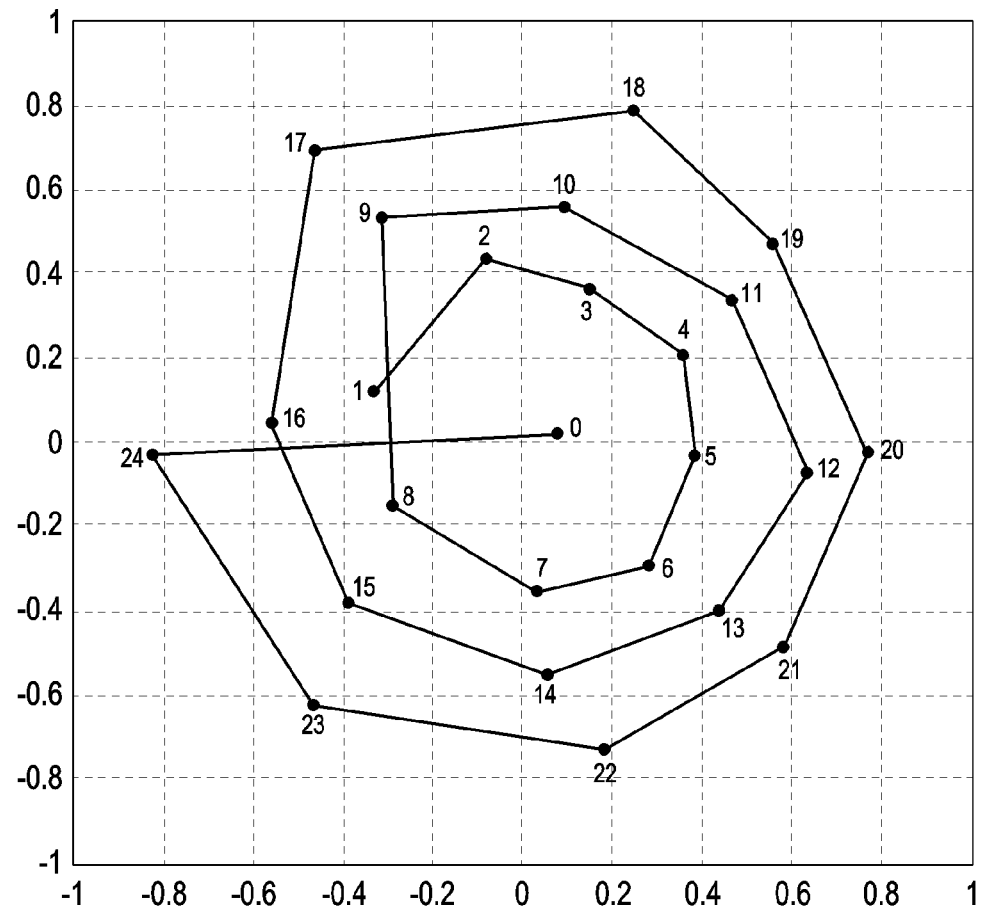
FIG. 4 illustrates coordinates through normalization of I and Q values of a lookup table according to various embodiments.

FIG. 3 illustrates an internal structure of a coupler in detail according to various embodiments, and FIG. 4 illustrates an I value and a Q value of a lookup table as coordinates through normalization according to various embodiments.

Referring to FIGS. 3 and 4, the coupler 241 according to various embodiments may be a bidirectional coupler, and may detect each of a Tx signal transmitted to the outside through the coupler 241 and an Rx signal received from the antenna 251. A Tx signal (for example, a1) generated from the transceiver 210 may pass through the coupler 241, and a Tx signal (a2) passing through the coupler 241 may be output (or radiated) to the outside through the antenna 251. The coupler 241 may input the Tx signal (for example, a1), output the Tx signal (for example, a2), and transmit the Tx signal to the antenna 251. The electronic device 101 may allow the Tx signal (for example, a1) to be output as the Tx signal (for example, a2) and transmitted to the antenna 251 through the coupler 241, and may detect the forward coupling signal (for example, b3). Further, the electronic device 101 may transmit the Rx signal (for example, b2) received through the antenna 251 and the reverse coupling signal (for example, b4), which is not radiated through the antenna 251 but is reflected from the antenna 251, to the transceiver 210 through the coupler 241. The signal (for example, b1) is a signal that is unable to pass through the coupler 241, is reflected therefrom, and is transmitted to the transceiver 210 again among the Tx signals (for example, a1) output from the transceiver 210.

According to various embodiments, the electronic device 101 (for example, the processor 120) may individually detect the forward coupling signal of the Tx signal and the reverse coupling signal, which is not radiated through the antenna 251 but is reflected from the antenna 251, through the coupler 241. The electronic device 101 (for example, the processor 120) may calculate a reflection coefficient (Fin) based on the reverse coupling signal using [Equation 1] or [Equation 2] below.

The electronic device 101 (for example, the processor 120) may calculate the reflection coefficient based at least partially on the transmission (Tx) signal (for example, a2), the forward coupling signal (for example, b3), or the reverse coupling signal (for example, b4). The processor 120 may calculate a reflection coefficient (Γ) through [Equation 1] or [Equation 2] below.

$$Y(n) = \Gamma X(n) + W(n) \quad n=1,2,3,\ldots N \qquad \text{[Equation 1]}$$

In [Equation 1] above, Y(n) denotes a transmission (Tx) signal (for example, a2), X(n) denotes a forward coupling signal (for example, b3), and W(n) denotes noise generated by the coupler 241. The reflection coefficient (Γ) may be calculated through the transmission (Tx) signal (for example, a2), the forward coupling signal (for example, a3), and the noise.

The reflection coefficient (Γ) may be proportional to f(S21, S31, S32, S41, S42 . . . )×b4/b3. [Equation 1] is an equation for calculating a reflection coefficient (Γ) at a point viewing the antenna and the coupler for a 4-port network when a bidirectional coupler or a coupler is connected to the antenna of the electronic device 101. The S parameters S21, S22, S31, S32, S41, and S42 may be specific values (constants). The reflection coefficient (Γ) corresponds to a value generated by dividing the reverse coupling signal (for example, b4) by the forward coupling signal (for example, b3). The equation may be stored in the memory. The S parameter is a circuit result value used for a radio frequency and means a ratio of an output voltage to an input voltage in frequency distribution. For example, S21 indicates a ratio between a voltage of a signal input into the first antenna 251 and a voltage of a signal output from a second antenna. The S parameter may be indicated as a matrix, as shown in [Equation 2] below.

$$S_{matrix} = \begin{pmatrix} S_{11} & S_{12} \\ S_{21} & S_{22} \end{pmatrix} \qquad \text{[Equation 2]}$$

In the S parameters when a plurality of antennas exists, S11 denotes a value of a voltage of a signal reflected through the first antenna compared to a voltage of a signal input into the first antenna, S21 denotes a value of a voltage of a signal received through the second antenna against a voltage of a signal input into the first antenna, S31 denotes a value of a signal received through a third antenna compared to a voltage of a signal input into the first antenna, and S41 denotes a value of a voltage of a signal received through a fourth antenna against a voltage of a signal input into the first antenna in [Equation 2]. Similarly, S22 denotes a value of a voltage of a signal reflected through the second antenna compared to a voltage of a signal input into the second antenna, S32 denotes a value of a voltage of a signal received through the third antenna compared to a voltage of a signal input into the second antenna, S42 denotes a value of a voltage of a signal received through the fourth antenna compared to a voltage of a signal input into the second antenna, and S43 denotes a value of a voltage of a signal received through the fourth antenna compared to a voltage of a signal input into the third antenna.

For example, a lookup table (for example, NV LUT) showing the magnitude and the phase of a signal corresponding to the reflection coefficient is as shown in [Table 1] below.

TABLE 1

| Magnitude | Phase | I Value | Q Value |
| --- | --- | --- | --- |
| 0 | 0 | 1295 | 348 |
| 0.4 | 0 | −5416 | 1967 |
| 0.4 | 45 | −1321 | 7148 |
| 0.4 | 90 | 2467 | 5920 |
| 0.4 | 135 | 5839 | 3361 |
| 0.4 | 180 | 6248 | −593 |
| 0.4 | 225 | 4703 | −4785 |
| 0.4 | 270 | 563 | −5831 |
| 0.4 | 315 | −4748 | −2458 |
| 0.6 | 22.5 | −5098 | 8744 |
| 0.6 | 67.5 | 1548 | 9153 |
| 0.6 | 112.5 | 7634 | 5490 |
| 0.6 | 157.5 | 10358 | −1188 |
| 0.6 | 202.5 | 7191 | −6585 |
| 0.6 | 247.5 | 954 | −9044 |
| 0.6 | 292.5 | −6389 | −6232 |
| 0.6 | 337.5 | −9130 | 728 |
| 0.8 | 0 | −7556 | 11327 |
| 0.8 | 45 | 4055 | 12926 |
| 0.8 | 90 | 9151 | 7679 |
| 0.8 | 135 | 12625 | −409 |
| 0.8 | 180 | 9521 | −7985 |
| 0.8 | 225 | 3029 | −11993 |
| 0.8 | 270 | −7609 | −10256 |
| 0.8 | 315 | −13452 | −457 |

[Table 1] above is a table showing the detailed magnitude and phase of a signal corresponding to the calculated reflection coefficient. FIG. 4 illustrates an I value and a Q value in [Table 1] above as coordinates through normalization, and the horizontal axis indicates the value of I and the vertical axis indicates the value of Q in FIG. 4. For example, when the magnitude of the signal is 0.4 and the phase of the signal is 45 degrees in [Table 1] above, the value of I for the signal is −1321 and the value of Q for the signal is 7148, which may be expressed as coordinates 401 of FIG. 4. [Table 1] above is a table according to an embodiment, and each value may be variably changed. The table may be a table configured on the basis of the reflection coefficient of the antenna. The table may include the magnitude and the phase of a signal corresponding to a transfer coefficient. The lookup table may be stored in the memory 130, and may be updated when an object type and a distance from the object are determined. The electronic device 101 may store at least one of the determined type of the external object and the determined distance from the external object in the lookup table on the basis of at least of the reflection coefficient and the transfer coefficient.

For example, when the magnitude of at least one signal of the reflection coefficient or the transfer coefficient of the antenna is 0.0 and the phase is 0.0, the electronic device 101 may be in the state in which there is no object (entity) in the vicinity thereof. The magnitude and the phase of each signal recorded in the table may indicate a preset state of the electronic device 101 corresponding to the magnitude and the phase of each signal. For example, when the magnitude of the signal is 0.80 and the phase is 315.0, the electronic device 101 may determine that the value of I is −13452, the value of Q is −457, and the object exists near the electronic device (for example, within several cm therefrom).

According to various embodiments, the electronic device 101 (for example, the processor 120) may determine the magnitude and the phase of the signal corresponding to at least one of the reflection coefficient or the transfer coefficient of the antenna, or may acquire the magnitude and the phase of the signal corresponding to at least one of the reflection coefficient or the transfer coefficient of the antenna through the table. According to various embodiments, when the object exists near the electronic device 101, the electronic device 101 (for example, the processor 120) may calculate at least one of the reflection coefficient or the transfer coefficient of the antenna and pre-store the magnitude and the phase of the signal corresponding to at least one of the calculated reflection coefficient or transfer coefficient of the antenna in the table.

According to various embodiments, the electronic device 101 (for example, the processor 120) may determine a type of the object adjacent to the electronic device or a distance from the object on the basis of the table corresponding to the antenna. For example, according to various embodiments, when the object exists adjacent to the electronic device 101, the electronic device 101 (for example, the processor 120) may calculate at least one of the reflection coefficient or the transfer coefficient of the diversity antenna corresponding to the object adjacent to the electronic device and store the magnitude and the phase of the signal corresponding to at least one of the calculated reflection coefficient or transfer coefficient of the diversity antenna in the table corresponding to the diversity antenna.

Figure 5:
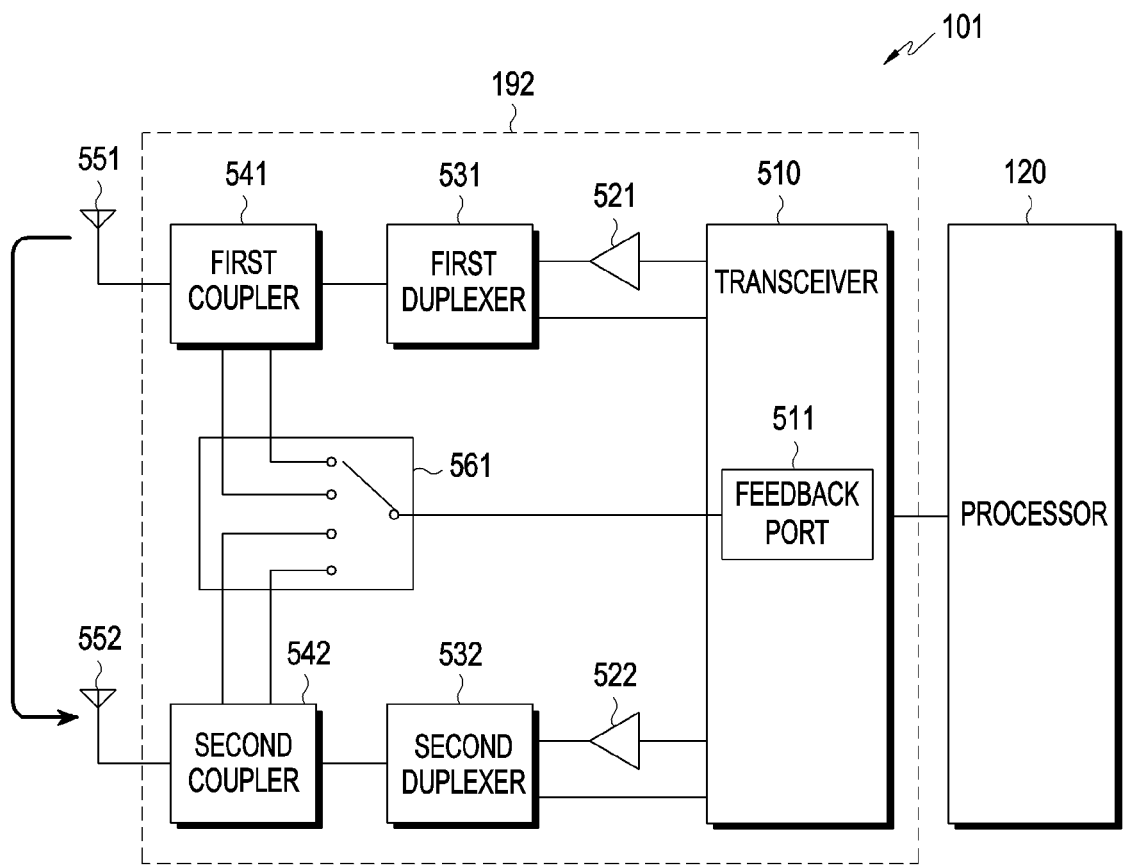
FIG. 5 is a block diagram of an electronic device performing a function on the basis of an external object according to various embodiments.

FIG. 5 is a block diagram of an electronic device performing a function on the basis of an external object according to various embodiments.

More specifically, FIG. 5 is a first block diagram of the electronic device 101 for determining a type of an external object located adjacent to the electronic device 101 or a distance from the external object based at least partially on a reflection coefficient or a transfer coefficient according to various embodiments.

Referring to FIG. 5, the electronic device 101 calculating the reflection coefficient and the transfer coefficient according to various embodiments may include the processor 120, the wireless communication module 192 (or a communication circuit), a first antenna 551, and a second antenna 552. The wireless communication module 192 may include a transceiver 510, a first power amplifier 521, a second power amplifier 522, a first duplexer 531, a second duplexer 532, a first coupler 541, a second coupler 542, and a switch 561. The wireless communication module 192 may include a transceiver for generating at least one signal, at least one amplifier for amplifying the generated signals, at least one duplexer for dividing the amplified signals according to communication bands thereof, and at least one coupler for transmitting the divided signals through at least one of the first antenna or the second antenna. The first coupler 541 may be disposed between the first antenna 551 and the first duplexer 531, and the second coupler 542 may be disposed between the second antenna 552 and the second duplexer 532. The switch 561 may be disposed between the first coupler 541 and the second coupler 542, and may switch signals received by the first coupler 541 and the second coupler 542 and transfer the signals to the transceiver 510.

According to various embodiments, the processor 120 may perform the same operation as the processor 120 of FIG. 2, or may perform at least one operation or function. The transceiver 510 may perform the same operation as the transceiver 210 of FIG. 2, or may perform at least one operation or function. At least one of the first power amplifier 521 or the second power amplifier 522 may perform the same operation as the power amplifier 221 of FIG. 2, or may perform at least one operation or function. At least one of the first duplexer 531 or the second duplexer 532 may perform the same operation as the duplexer 231 of FIG. 2, or may perform at least one operation or function. At least one of the first coupler 541 or the second coupler 542 may perform the same operation as the coupler 241 of FIG. 2, or may perform at least one operation or function.

According to various embodiments, the switch 561 may switch signals transmitted between elements (for example, the first coupler 541 and the second coupler 542). The switch 561 may receive a signal from the first coupler 541 or the second coupler 542 and transfer the signal to the transceiver 510. According to an embodiment, the switch 561 may receive a signal received from the first antenna 551 through the first coupler 541 and transfer the received signal to the transceiver 51. According to another embodiment, the switch 561 may receive a signal received from the second antenna 552 through the second coupler 542 and transfer the received signal to the transceiver 510. The switch 561 may transfer a signal received from at least one of the first antenna 551 or the second antenna 552 to a feedback port 511 of the transceiver 510.

According to various embodiments, the switch 561 may transfer a signal (for example, a forward coupling signal) branched by the first coupler 541 from some of the transmission signals transmitted from the first duplexer 531 to the transceiver 510. According to an embodiment, the switch 561 may switch some signals branched from the transmission signals by the first coupler 541 and transfer the same to the transceiver 510 (for example, the feedback port 511). For example, the branched signals may include a forward coupling signal. According to another embodiment, the switch 561 may transfer a signal that is not radiated through the first antenna 551 but is reflected therefrom to the transceiver 510. According to an embodiment, the switch 561 may switch a signal (for example, a reverse coupling signal) that is not radiated through the first antenna 551 but is reflected therefrom and transfer the same to the transceiver 510 (for example, the feedback port 511). The electronic device 101 (for example, the processor 120) may use the reverse coupling signal to calculate the reflection coefficient. The reflection coefficient may be calculated as the ratio (for example, S11) of the voltage of the signal reflected from the first antenna 551 to the voltage of the signal input into the first antenna 551. Further, the reflection coefficient may be calculated as the ratio (for example, S22) of the voltage of the signal reflected from the second antenna 552 to the voltage of the signal input into the second antenna 552.

According to various embodiments, the switch 561 may transfer a signal (for example, a forward coupling signal) branched by the second coupler 542 from some of the transmission signals transmitted from the second duplexer 532 to the transceiver 510. According to an embodiment, the switch 561 may switch some signals branched by the second coupler 542 and transfer the signals to the transceiver 510 (for example, the feedback port 511). For example, the branched signal may include a forward coupling signal. According to another embodiment, the switch 561 may transfer a signal branched by the second coupler 542 from some of the reception signals received from the second antenna 552 to the transceiver 510. According to an embodiment, the switch 561 may switch some signals branched by the second antenna 552 and transfer the signals to the transceiver 510 (for example, the feedback port 511).

According to various embodiments, some of the signals output through the first antenna 551 may be received by the second antenna 552. When some of the signals output through the first antenna 551 are input through the second coupler 542, the switch 561 may switch some signals input through the second coupler 542 and transfer the signals to the transceiver 510 (for example, the feedback port 511). The electronic device 101 (for example, the processor 120) may calculate a transfer coefficient on the basis of some signals input through the switch 561. The transfer coefficient may be calculated using a ratio (for example, S21) of the voltage of the signal received through the second antenna 552 to the voltage of the signal input into the first antenna 551. Further, the transfer coefficient may be calculated using the ratio (for example, S12) of the voltage of the signal received through the first antenna 551 to the voltage of the signal input into the second antenna 552.

The electronic device 101 (for example, the processor 120) may calculate at least one of a type of an object adjacent to the electronic device 101 and a distance from the object based at least partially on the reflection coefficient or the transfer coefficient. In general, when an object having a dielectric constant that is the same as a hand, a head, or the electronic device is adjacent to the antenna, input impedance facing the antenna and a coupling coefficient between antennas may change due to a change in a dielectric constant around the antenna. The electronic device 101 may analyze a change in a phase and a strength of the signal received by the second antenna 552 among the signals output through the first antenna 551, and determine a type of an object existing around the electronic device 101 and a distance from the object.

The electronic device 101 (for example, the processor 120) may determine at least one of the type of the object adjacent to the electronic device 101 or the distance from the object based at least partially on the signals that are branched through the first coupler 541 and input into the feedback port 511 of the transceiver 510 and the signals that are output through the first antenna 551 and received through the second antenna 552. According to an embodiment, the electronic device 101 (for example, the processor 120) may perform a predetermined function according to a value corresponding to the distance between the electronic device 101 and an external object based at least partially on the reflection coefficient and the transfer coefficient. The electronic device 101 (for example, the processor 120) may perform a predetermined function (or operation) as at least one of the type of the object adjacent to the electronic device 101 or the distance from the object is identified based at least partially on the reflection coefficient or the transfer coefficient. For example, when the object is another electronic device (for example, the electronic device 102 of FIG. 1), the electronic device 101 (for example, the processor 120) may activate a communication module (for example, Bluetooth, NFC, Wi-Fi, or wireless charging module) for performing wired communication and/or wireless communication with another electronic device (for example, the electronic device 102 of FIG. 1). According to an embodiment, the electronic device 101 (for example, the processor 120) may perform an operation of adjusting the transmission power used for communication to a predetermined magnitude through the communication module as at least the part of the predetermined function.

Figure 6:
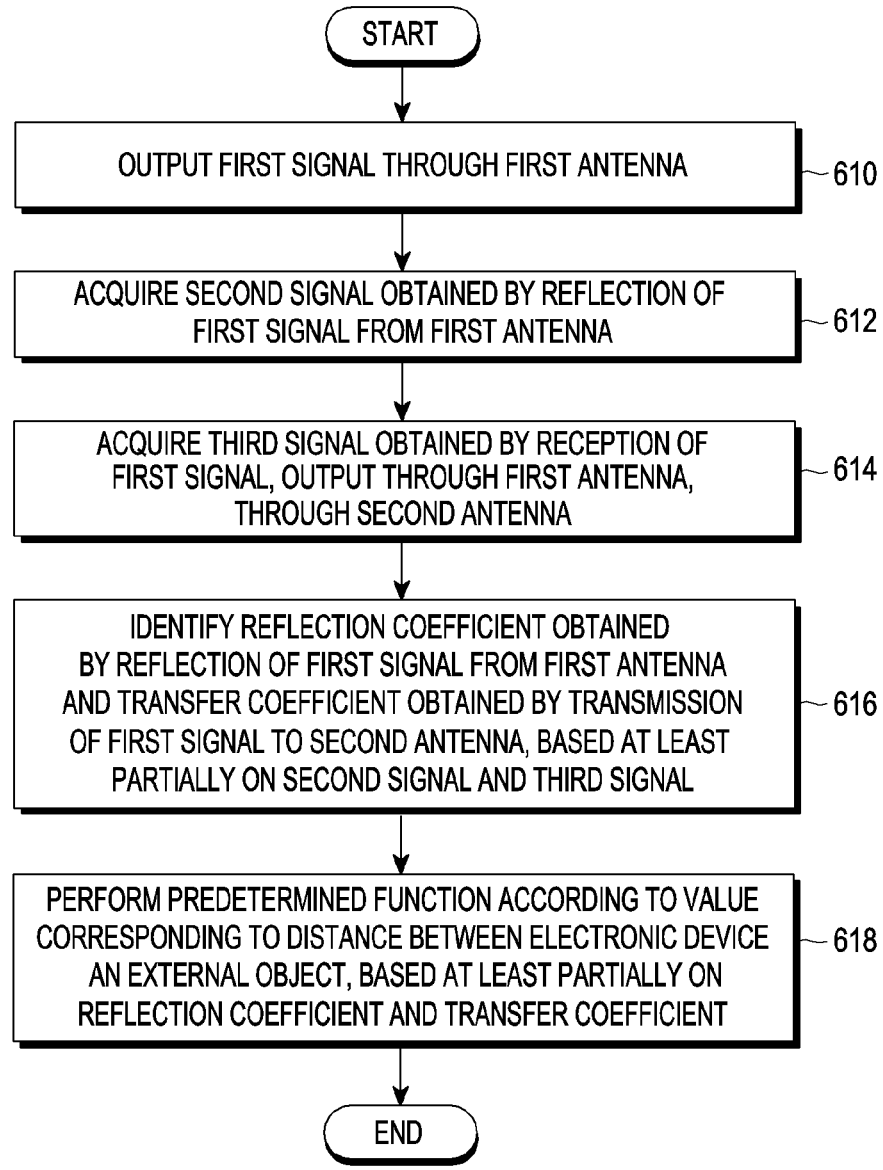
FIG. 6 is a flowchart illustrating an operation in which an electronic device performs a function on the basis of an external object according to various embodiments.

FIG. 6 is a flowchart illustrating an operation in which the electronic device performs a function on the basis of an external object according to various embodiments.

Hereinafter, the operation in which the electronic device according to an embodiment performs the function on the basis of the external object is described in detail with reference to FIG. 6.

According to various embodiments, in operation 610, the electronic device 101 (for example, the processor 120) may output a first signal to a first antenna. The electronic device 101 (for example, the processor 120) may transmit the first signal through the transceiver 510, the power amplifier 521, the first duplexer 531, and the first antenna 551. According to an embodiment, the electronic device 101 (for example, the processor 120) may transmit a signal through the transceiver 310, the signal output through the transceiver 310 may be amplified through the power amplifier 321, the amplified signal may be transmitted to the first coupler 541 via the first duplexer 531, and the first signal output through the first coupler 541 may be output through the first antenna. The signal output through the first antenna 551 may be transmitted to another electronic device. The electronic device 101 (for example, the processor 120) may acquire a forward coupling signal of the first signal from the first coupler 541.

According to various embodiments, in operation 612, the electronic device 101 (for example, the processor 120) may acquire a second signal, obtained by reflection of the first signal from the first antenna. According to an embodiment, the electronic device 101 (for example, the processor 120) may detect a second signal (for example, a reverse coupling signal), which is not radiated from the first antenna 551 but is reflected therefrom. The second signal, which is the part of the signals radiated from the first antenna, may not be radiated through the first antenna but may be reflected therefrom, and thus may be fed back from the first coupler 541 to the transceiver 510 (for example, feedback port 511). According to an embodiment, the fed back second signal may include a reverse coupling signal. The electronic device 101 (for example, the processor 120) may identify a reflection coefficient obtained by reflection of the first signal from the first antenna on the basis of at least the part of the second signal.

According to various embodiments, in operation 614, the electronic device 101 (for example, the processor 120) may acquire a third signal, obtained by reception of the first signal through the second antenna output through the first antenna. According to an embodiment, the electronic device 101 (for example, the processor 120) may receive, through the second antenna 552, the third signal, which is the part of the first signal output through the first antenna 551. The electronic device 101 (for example, the processor 120) may receive most of the signals received from the second antenna 552 through the second duplexer 532 and transmit some signals to the feedback port 511 through the second coupler 542 and the switch 561. When some of the signals output through the first antenna 551 are input through the second coupler 542, the switch 561 may switch some signals input through the second coupler 542 and transfer the signals to the transceiver 510 (for example, the feedback port 511). The switch 561 may operate to transmit signals received from at least one of the first antenna 551 or the second antenna 552 to the feedback port 511 of the transceiver 510.

According to various embodiments, in operation 616, the electronic device 101 (for example, the processor 120) may identify a reflection coefficient obtained by reflection of the first signal from the first antenna and a transfer coefficient obtained by transmission of the first signal to the second antenna based at least partially on the second signal and the third signal. According to an embodiment, the electronic device 101 (for example, the processor 120) may calculate the reflection coefficient of the antenna 551 based at least partially on the second signal (for example, a reverse coupling signal) or the third signal detected by the first coupler 541. According to an embodiment, the electronic device 101 (for example, the processor) may use the reflection coefficient of the antenna 551 based at least partially on the reverse coupling signal or the third signal in order to determine at least one of a type of an object adjacent to the electronic device 101 or a distance from the object. According to an embodiment, the electronic device 101 (for example, the processor 120) may detect reception of some of the signals output through the first antenna 551 by the second antenna 552. When some of the signals output through the first antenna 551 are received through the second antenna 552, the electronic device 101 (for example, the processor) may calculate the transfer coefficient on the basis of some signals input through the second antenna 552. The electronic device 101 (for example, the processor 120) may identify (or calculate) at least one of the type of the object adjacent to the electronic device 101 or the distance from the object based at least partially on the reflection coefficient or the transfer coefficient.

According to various embodiments, in operation 618, the electronic device 101 (for example, the processor 120) may perform a predetermined function according to a value corresponding to the distance between the electronic device 101 and the external object based at least partially on the reflection coefficient and the transfer coefficient. The electronic device 101 (for example, the processor 120) may perform a predetermined function (or operation) as at least one of the type of the object adjacent to the electronic device 101 or the distance from the object is identified based at least partially on the reflection coefficient or the transfer coefficient. According to an embodiment, the electronic device 101 (for example, the processor 120) may use at least a part of the reflection coefficient or the transfer coefficient to perform at least one function based on the type of the object or the distance from the object. For example, when the object is another electronic device (for example, the electronic device 102 of FIG. 1), the electronic device 101 (for example, the processor 120) may activate a communication module (for example, Bluetooth, NFC, Wi-Fi, or wireless charging module) for performing wired communication and/or wireless communication with another electronic device (for example, the electronic device 102 of FIG. 1). According to an embodiment, the electronic device 101 (for example, the processor 120) may perform an operation of adjusting the transmission power used for the communication to a predetermined magnitude through the communication module as at least the part of the predetermined function.

According to various embodiments, an operation in which the electronic device performs a function on the basis of an external object may include an operation of acquiring a second signal obtained by reflection of the first signal from the first antenna and a third signal acquired by reception of the first signal output through the first antenna by the second antenna, an operation of identifying a reflection coefficient obtained by reflection of the first signal from the first antenna and a transfer coefficient obtained by transmission of the first signal to the second antenna based at least partially on the second signal and the third signal, and an operation of performing a predetermined function according to a value corresponding to a distance between the electronic device and an external object based at least partially on the reflection coefficient and the transfer coefficient.

According to an embodiment, the operation of identifying a value corresponding to the distance, based on a lookup table stored in the memory may be further included.

According to an embodiment, an operation of performing an operation of adjusting the transmission power used for communication to a predetermined magnitude through the communication module as at least a part of the predetermined function may be further included.

According to an embodiment, an operation of identifying at least one of the type of the external object or the distance from the external object, based at least partially on the reflection coefficient and the transfer coefficient, may be further included.

According to an embodiment, an operation of storing at least one of the type of the external object or the distance from the external object, determined based at least partially on the reflection coefficient and the transfer coefficient in the lookup table, may be further included.

According to various embodiments, an operation of calculating the reflection coefficient, based on a voltage of the second signal and a voltage of the first signal and an operation of calculating the transfer coefficient, based on a voltage of the third signal and the voltage of the first signal may be further included.

According to various embodiments, the electronic device may include an operation of outputting a first signal through the first antenna using the coupler, acquiring a second signal reflected through the first antenna and a third signal, obtained by reception of the first signal output through the first antenna, through the second antenna on the basis of the output first signal, identifying a reflection coefficient obtained by reflection of the first signal from the first antenna and a transfer coefficient obtained by transmission of the first signal to the second antenna based at least partially on the second signal and the third signal, and determining at least one of a type of an external object and a distance from the external object based at least partially on the reflection coefficient and the transfer coefficient.

According to an embodiment, an operation of storing at least one of the type of the external object or the distance from the external object, determined based at least partially on the reflection coefficient and the transfer coefficient in the lookup table may be further included.

According to an embodiment, an operation of performing an operation of adjusting the transmission power used for communication to a predetermined magnitude through the communication module as at least a part of the predetermined function may be further included.

According to an embodiment, an operation of identifying at least one of the type of the external object or the distance from the external object, based at least partially on the reflection coefficient and the transfer coefficient may be further included.

According to an embodiment, an operation of storing at least one of the type of the external object or the distance from the external object, determined based at least partially on the reflection coefficient and the transfer coefficient in the lookup table may be further included.

According to various embodiments, an operation of calculating the reflection coefficient, based on a voltage of the second signal and a voltage of the first signal and an operation of calculating the transfer coefficient, based on a voltage of the third signal and the voltage of the first signal may be further included.

Figure 7:
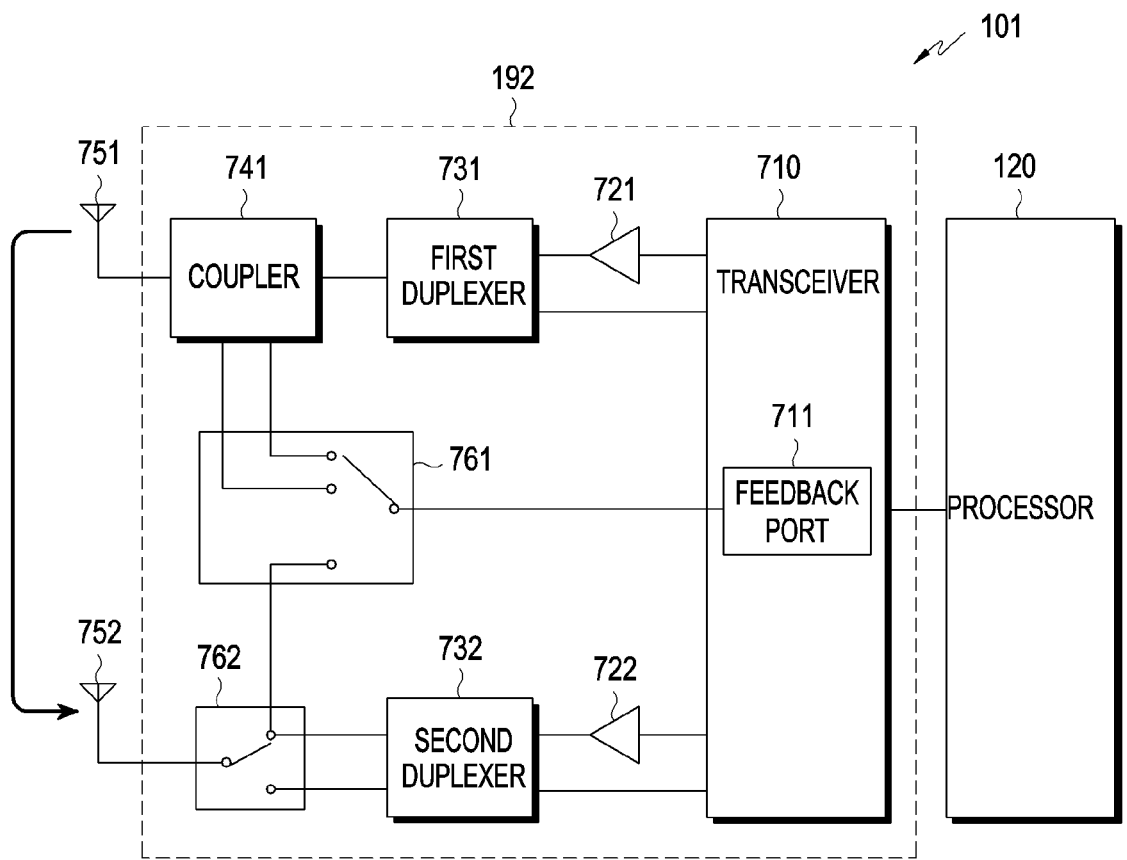
FIG. 7 is a block diagram of an electronic device performing a function on the basis of an external object according to various embodiments.

FIG. 7 is a block diagram of an electronic device performing a function on the basis of an external object according to various embodiments.

More specifically, FIG. 7 is a second block diagram of the electronic device 101 for determining a type of an external object adjacent to the electronic device 101 or a distance from the external object based at least partially on a reflection coefficient or a transfer coefficient according to various embodiments.

Referring to FIG. 7, the electronic device 101 calculating the reflection coefficient and the transfer coefficient according to various embodiments may include the processor 120, the wireless communication module 192, a first antenna 751, and a second antenna 752. The wireless communication module 192 (or a communication circuit) may include a transceiver 710, a first power amplifier 721, a second power amplifier 722, a first duplexer 731, a second duplexer 732, a coupler 741, a first switch 761, and a second switch 762. The wireless communication module 192 may further include the first switch 761, disposed between the coupler 741 and the second switch 762, and the second switch 762, disposed between the second antenna 752 and the second duplexer 732. The second switch 762 and the first switch 761 may be electrically connected, and the second switch 762 may switch a signal to the first switch 761.

The processor 120 may perform the same operation as the processor 120 of FIG. 2, or may perform at least one operation or function. The transceiver 710 may perform the same operation as the transceiver 210 of FIG. 2, or may perform at least one operation or function. At least one of the first power amplifier 721 or the second power amplifier 722 may perform the same operation as the power amplifier 221 of FIG. 2, or may perform at least one operation or function. At least one of the first duplexer 731 or the second duplexer 732 may perform the same operation as the duplexer 231 of FIG. 2, or may perform at least one operation or function. The coupler 741 may perform the same operation as the coupler 241 of FIG. 2, or may perform at least one operation or function. The first switch 761 may perform the same operation as the switch 561 of FIG. 5, or may perform at least one operation or function.

According to various embodiments, the first switch 761 may switch a signal transmitted between elements (for example, the coupler 741 and the second switch 762). The first switch 761 may receive a signal from the coupler 741 or the second switch 762 and transmit the signal to the transceiver 510. According to an embodiment, the first switch 761 may receive a signal received from the first antenna 751 through the coupler 741 and transmit the received signal to the transceiver 710. According to another embodiment, the first switch 761 may receive a signal received from the second antenna 752 through the second switch 742 and transmit the received signal to the transceiver 710. The first switch 761 may transmit a signal received from at least one of the first antenna 751 or the second antenna 752 to a feedback port 711 of the transceiver 710.

According to various embodiments, the first switch 761 may transmit signals branched by the coupler 741 from some of the transmission signals transmitted from the first duplexer 731 to the transceiver 710. According an embodiment, the first switch 761 may switch some of the signals branched from the transmission signals by the coupler 741 and transmit the signals to the transceiver 710 (for example, the feedback port 711). For example, the branched signals may include a forward coupling signal. According to another embodiment, the first switch 761 may transmit a signal (for example, a reverse coupling signal), which is not radiated through the first antenna 751 but is reflected therefrom, to the transceiver 710. According to an embodiment, the first switch 761 may switch the signal that is not radiated through the first antenna 751 but is reflected therefrom and transmit the signal to the transceiver 710 (for example, the feedback port 711).

According to various embodiments, the second switch 762 may switch the signal received from the second antenna 752 to one of the first switch 761 or the second duplexer 732. The received signal may include some of the signals radiated from the first antenna 751, which are received by the second antenna 752. According to an embodiment, some of the signals radiated through the first antenna 751 may be received through the second antenna 752. When some of the signals radiated through the first antenna 751 are received through the second antenna 752, the second switch 762 may switch some signals received through the second antenna 752 and transmit the signals to the second duplexer 732 or the first switch 761. The electronic device 101 (for example, the processor 120) may calculate a transfer coefficient on the basis of some signals input through the first switch 761. The electronic device 101 (for example, the processor 120) may calculate at least one of a type of an object adjacent to the electronic device 101 and a distance from the object based at least partially on the reflection coefficient or the transfer coefficient. The electronic device 101 (for example, the processor 120) may determine at least one of a type of an object adjacent to the electronic device 101 or a distance from the object based at least partially on the signals, which are branched through the coupler 741 and input into the feedback port 711 of the transceiver 710, and the signals, which are output through the first antenna 751 and received through the second antenna 752. According to an embodiment, the electronic device 101 (for example, the processor 120) may perform a predetermined function according to a value corresponding to the distance between the electronic device 101 and an external object based at least partially on the reflection coefficient and the transfer coefficient. The electronic device 101 (for example, the processor 120) may perform a predetermined function (or operation) as at least one of the type of the object adjacent to the electronic device 101 or the distance from the object is identified based at least partially on the reflection coefficient or the transfer coefficient.

Figure 8:
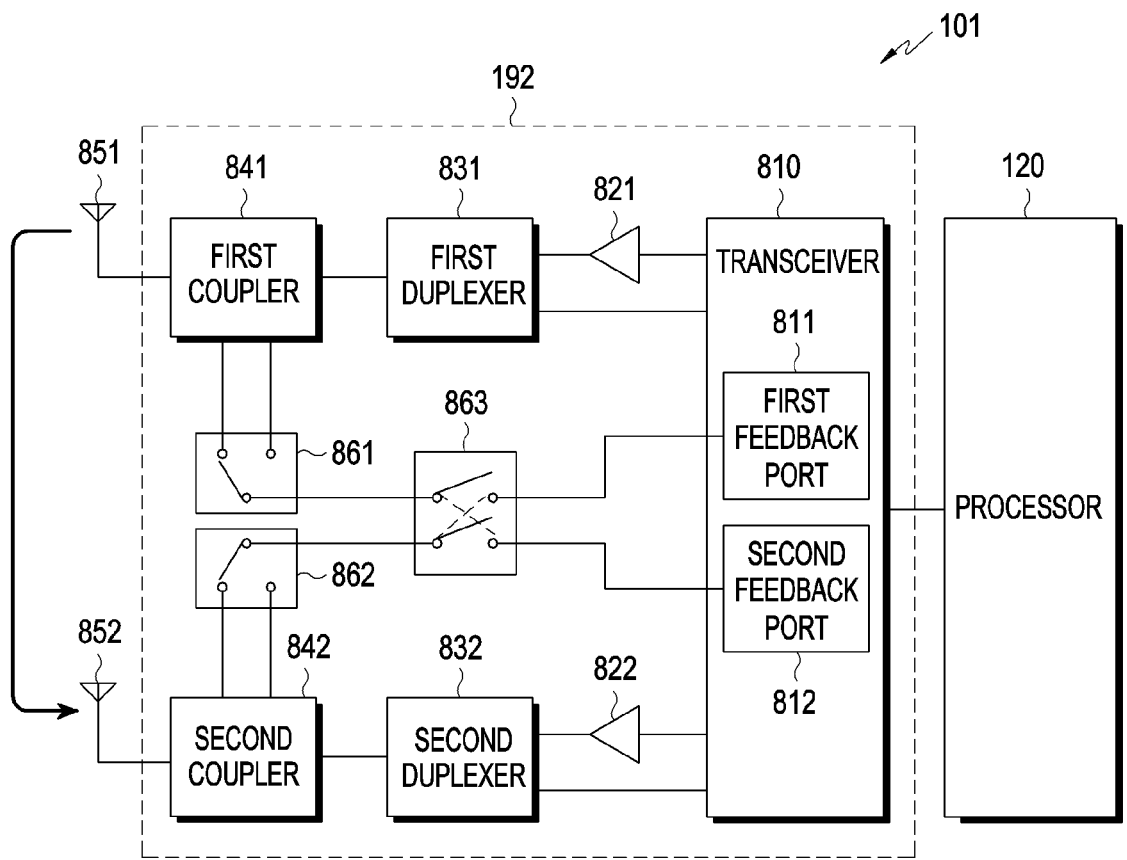
FIG. 8 is a block diagram of an electronic device performing a function on the basis of an external object according to various embodiments.

FIG. 8 is a block diagram of an electronic device performing a function on the basis of an external object according to various embodiments.

More specifically, FIG. 8 is a third block diagram of the electronic device 101 for determining a type of an external object adjacent to the electronic device 101 or a distance from the external object based at least partially on a reflection coefficient or a transfer coefficient according to various embodiments.

Referring to FIG. 8, the electronic device 101 calculating the reflection coefficient and the transfer coefficient according to various embodiments may include the processor 120, the wireless communication module 192, a first antenna 851, and a second antenna 852. The wireless communication module 192 may include a transceiver 810, a first power amplifier 821, a second power amplifier 822, a first duplexer 831, a second duplexer 832, a first coupler 841, a second duplexer 842, a first switch 861, a second switch 862, and a third switch 863. The wireless communication module 192 may further include a first switch for switching a second signal output through the first coupler, which receives the reflected second signal, a second switch for switching a third signal output through the second coupler, which receives the received third signal, and a third switch for switching signals output from the first switch and the second switch to be transmitted to the transceiver. The third switch 863 may include a Dual Pole-Dual Throw (DPDT) switch operating to receive the switched signals from the first switch and the second switch and to transmit the signals to the transceiver, and the transceiver may include two feedback ports for receiving the respective signals. The third switch 863 may include switching terminals corresponding in number to the number of antennas included in the electronic device.

According to various embodiments, the processor 120 may perform the same operation as the processor 120 of FIG. 2, or may perform at least one operation or function. The transceiver 810 may perform the same operation as the transceiver 210 of FIG. 2, or may perform at least one operation or function. At least one of the first power amplifier 821 or the second power amplifier 822 may perform the same operation as the power amplifier 221 of FIG. 2, or may perform at least one operation or function. At least one of the first duplexer 831 or the second duplexer 832 may perform the same operation as the duplexer 231 of FIG. 2, or may perform at least one operation or function. At least one of the first coupler 841 or the second coupler 842 may perform the same operation as the coupler 241 of FIG. 2, or may perform at least one operation or function.

According to various embodiments, the first switch 861 may switch signals branched through the first coupler 841 and transmit the signals to the third switch 863. The first switch 861 may receive the signal from the first coupler 841 and transmit the signal to the third switch 863. The third switch 863 may switch the signal received from the first switch 861 and transmit the signal to the transceiver 810. According to an embodiment, the first switch 861 may receive the signal received from the first antenna 851 through the first coupler 841 and transmit the signal to the transceiver 810 through the third switch 863. The first switch 861 may transmit the signal received from the first coupler 841 to one of a first feedback port 811 or a second feedback port 812 of the transceiver 810 through the third switch 863.

According to various embodiments, the first switch 861 may transmit, to the transceiver 810, the signals branched by the first coupler 841 from the transmission signals transmitted from the first duplexer 841. For example, the branched signals may include a forward coupling signal. According to another embodiment, the first switch 861 may transmit a signal that is not radiated through the first antenna 851 but is reflected therefrom to the transceiver 810. The electronic device 101 (for example, the processor 120) may calculate a reflection coefficient on the basis of some of the transmission signals branched by the first coupler 841.

According to various embodiments, some of the signals output through the first antenna 851 may be received by the second antenna 852. When some of the signals radiated through the first antenna 851 are received by the second coupler 842 via the second antenna 852, the second switch 862 may switch some signals received through the second coupler 842 and transmit the signals to the third switch 863. The electronic device 101 (for example, the processor 120) may calculate a transfer coefficient on the basis of some signal input through the second antenna 852, the second coupler 842, the second switch 862, and the third switch 863. The electronic device 101 (for example, the processor 120) may calculate at least one of a type of an object adjacent to the electronic device 101 and a distance from the object based at least partially on the reflection coefficient or the transfer coefficient. The electronic device 101 (for example, the processor 120) may determine at least one of the type of the object adjacent to the electronic device 101 or the distance from the object based at least partially on the signals that are branched through the first coupler 841 and input into the feedback port 811 of the transceiver 810 and the signals that are output through the first antenna 851 and received through the second antenna 852.

According to various embodiments, the third switch 863 may switch the signal switched through the first switch 861 and transmit the signal to the transceiver 810. The third switch 863 may receive the signal output from the first coupler 841 through the first switch 861 and transmit the signal to the first feedback port 811 of the transceiver 810. According to an embodiment, the third switch 863 may transmit the signal that is output through the first antenna 851 and received through the second antenna 852, the second coupler 842, and the second switch 862 to the second feedback port 812 of the transceiver 810. The electronic device 101 (for example, the processor 120) may determine at least one of the type of the object adjacent to the electronic device 101 or the distance from the object based at least partially on the signals that are branched through the first coupler 841 and input into the feedback port 810 of the transceiver 811 and the signals that are output through the first antenna 851 and received through the second antenna 852. The third switch may include a Dual Pole-Dual Throw (DPDT) switch. According to an embodiment, the electronic device 101 (for example, the processor 120) may perform a predetermined function according to a value corresponding to the distance between the electronic device 101 and an external object based at least partially on the reflection coefficient and the transfer coefficient. The electronic device 101 (for example, the processor 120) may perform a predetermined function (or operation) as at least one of the type of the object adjacent to the electronic device 101 or the distance from the object is identified based at least partially on the reflection coefficient or the transfer coefficient.

Figure 9:
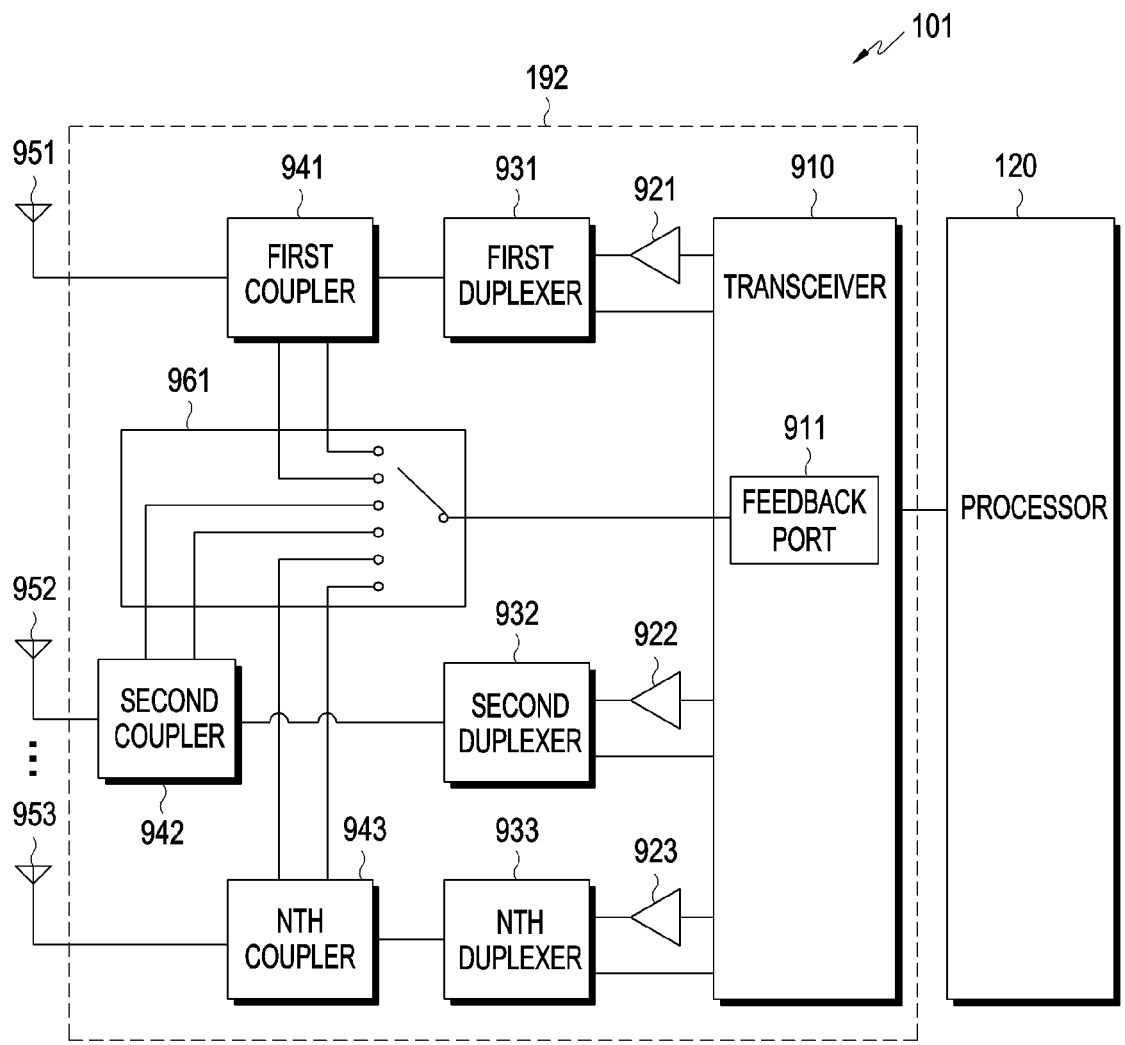
FIG. 9 is a block diagram of an electronic device performing a function on the basis of an external object according to various embodiments.

FIG. 9 is a block diagram of an electronic device performing a function on the basis of an external object according to various embodiments.

More specifically, FIG. 9 is a fourth block diagram of the electronic device 101 for determining a type of an external object located adjacent to the electronic device 101 or a distance from the external object based at least partially on a reflection coefficient or a transfer coefficient according to various embodiments.

Referring to FIG. 9, the electronic device 101 calculating a reflection coefficient and a transfer coefficient according to various embodiments may include the processor 120, the wireless communication module 192, a first antenna 951, a second antenna 952, and an Nth antenna 953. The wireless communication module 192 may include a transceiver 910, a first power amplifier 921, a second power amplifier 922, an Nth power amplifier 923, a first duplexer 931, a second duplexer 932, an Nth duplexer 933, a first coupler 941, a second coupler 942, an Nth coupler 943, and a switch 961. The processor 120 may perform the same operation as the processor 120 of FIG. 2, or may perform at least one operation or function. The transceiver 910 may perform the same operation as the transceiver 210 of FIG. 2, or may perform at least one operation or function. At least one of the first power amplifier 921, the second power amplifier 922, or the Nth power amplifier 923 may perform the same operation as the power amplifier 221 of FIG. 2, or may perform at least one operation or function. At least one of the first duplexer 931, the second duplexer 932, or the Nth duplexer 933 may perform the same operation as the duplexer 231 of FIG. 2, or may perform at least one operation or function. At least one of the first coupler 941, the second coupler 942, or the Nth coupler 943 may perform the same operation as the coupler 241 of FIG. 2, or may perform at least one operation or function. The switch 961 may perform the same operation as the switch 541 of FIG. 5, or may perform at least one operation or function. As illustrated in FIG. 9, the electronic device 101 according to various embodiments may include a plurality of power amplifiers 921, 922, and 923, a plurality of duplexers 931, 932, and 933, and a plurality of couplers 941, 942, and 943. Each of the power amplifiers, each of the duplexers, and each of the couplers may perform the operation performed by the power amplifier 221, the duplexer 231, and the coupler 241 of FIG. 2.

According to various embodiments, some of the signals radiated through the first antenna 951 may be received by at least one of the second antenna 952 or the Nth antenna 953. The electronic device 101 (for example, the processor 120) may determine at least one of a type of an object adjacent to the electronic device 101 or a distance from the object based at least partially on the signals that are not radiated through the first antenna 951 but are reflected therefrom and input into a feedback port 911 of the transceiver 910 and the signals that are output through the first antenna 951 and received through at least one of the second antenna 952 or the Nth antenna 953. According to an embodiment, the electronic device 101 (for example, the processor 120) may perform a predetermined function according to a value corresponding to the distance between the electronic device 101 and an external object based at least partially on the reflection coefficient and the transfer coefficient. The electronic device 101 (for example, the processor 120) may perform a predetermined function (or operation) as at least one of the type of the object adjacent to the electronic device 101 or the distance from the object is identified based at least partially on the reflection coefficient or the transfer coefficient.

According to various embodiments, the electronic device may include: a first antenna and a second antenna; a communication circuit including a coupler; and a processor electrically connected to the first and second antennas and the communication module, wherein the processor may be configured to control the communication circuit to output a first signal through the first antenna and to acquire a second signal, obtained by reflection of the first signal through the first antenna, and a third signal, obtained by reception of the first signal through the first antenna, through the second antenna, identify a reflection coefficient obtained by reflection of the first signal from the first antenna and a transfer coefficient obtained by transmission of the first signal to the second antenna, based at least partially on the second signal and the third signal, and perform a predetermined function according to a value corresponding to a distance between the electronic device and an external object, based at least partially on the reflection coefficient and the transfer coefficient.

According to an embodiment, the processor may be configured to perform an operation of adjusting the transmission power used for communication to a predetermined magnitude through the communication module as at least a part of the predetermined function.

According to an embodiment, the electronic device may further include a memory, and the processor may be configured to identify a value corresponding to the distance, based on a lookup table stored in the memory.

According to an embodiment, the processor may be configured to identify at least one of the type of the external object or the distance from the external object, based at least partially on the reflection coefficient and the transfer coefficient.

According to an embodiment, the processor may be configured to store at least one of the type of the external object or the distance from the external object, identified based at least partially on the reflection coefficient and the transfer coefficient in the lookup table.

According to an embodiment, the processor may be configured to calculate the reflection coefficient, based on a voltage of the second signal and a voltage of the first signal, and calculate the transfer coefficient, based on a voltage of the third signal and the voltage of the first signal.

According to an embodiment, the communication circuit may be configured to include a transceiver configured to generate at least one signal, at least one amplifier configured to amplify the generated signal, at least one duplexer configured to distinguish the amplified signals according to communication bands thereof, and at least one coupler configured to radiate the distinguished signals through at least one of the first antenna or the second antenna.

According to an embodiment, the communication circuit may further include a switch, which is disposed between the first coupler receiving the reflected second signal and the second coupler receiving the third signal and is configured to switch at least one of the received second signal or the third signal to be transmitted to the transceiver.

According to an embodiment, the communication circuit may further include a first switch configured to switch the third signal and a second switch, which is disposed between the first coupler receiving the reflected second signal and the first switch and is configured to switch at least one of the second signal or the third signal to be transmitted to the transceiver.

According to an embodiment, the communication circuit may further include a first switch, configured to switch the second signal output through the first coupler receiving the reflected second signal, a second switch, configured to switch the third signal output through the second coupler receiving the received third signal, and a third switch, configured to switch signals output from the first switch and the second switch to be transmitted to the transceiver.

According to an embodiment, the transceiver may include a first port configured to acquire the reflected second signal and a second port configured to acquire the reflected third signal, and the third switch may include a Dual Pole-Dual Throw (DPDT) configured to operate to receive the signal output from the first switch and transmit the signal to the first port and to receive the signal output from the second switch and transmit the signal to the second port.

According to an embodiment, the third switch may include switching terminals corresponding in number to the number of antennas included in the electronic device.

According to various embodiments, the electronic device may include: a first antenna and a second antenna; a communication circuit including a coupler; and a processor electrically connected to the first and second antennas and the communication module, wherein the processor may be configured to output a first signal through the first antenna using the coupler, acquire a second signal reflected through the first antenna and a third signal, obtained by reception of the first signal output through the first antenna, through the second antenna, based on the output first signal, identify a reflection coefficient, obtained by reflection of the first signal from the first antenna, and a transfer coefficient, obtained by transmission of the first signal to the second antenna, based at least partially on the second signal and the third signal, and identify at least one of a type of an external object and a distance from the external object, based at least partially on the reflection coefficient and the transfer coefficient.

According to an embodiment, the processor may be configured to store at least one of the type of the external object or the distance from the external object, identified based at least partially on the reflection coefficient and the transfer coefficient in a lookup table.

According to an embodiment, the wireless communication module may include a transceiver, configured to generate at least one signal, at least one amplifier configured to amplify the generated signal, at least one duplexer configured to distinguish the amplified signals according to communication bands thereof, and at least one coupler configured to radiate the distinguished signals through at least one of the first antenna or the second antenna.

According to an embodiment, the wireless communication module may further include a switch, which disposed between the first coupler receiving the reflected second signal and the second coupler receiving the received third signal and is configured to switch at least one of the received second signal or the third signal to be transmitted to the transceiver.

According to an embodiment, the wireless communication module may further include a first switch, configured to switch the third signal and a second switch disposed between the first coupler receiving the reflected second signal and the first switch and is configured to switch at least one of the received second signal or the third signal to be transmitted to the transceiver.

According to an embodiment, the wireless communication module may further include a first switch, configured to switch the second signal output through the first coupler receiving the reflected second signal, a second switch, configured to switch the third signal output through the second coupler receiving the received third signal, and a third switch, configured to switch signals output from the first switch and the second switch to be transmitted to the transceiver.

According to an embodiment, the transceiver may include a first port, configured to acquire the reflected second signal, and a second port, configured to acquire the reflected third signal, and the third switch may include a Dual Pole-Dual Throw (DPDT) switch, configured to operate to receive the signal output from the first switch and transmit the signal to the first port and to receive the signal output from the second switch and transmit the signal to the second port.

Figure 10:
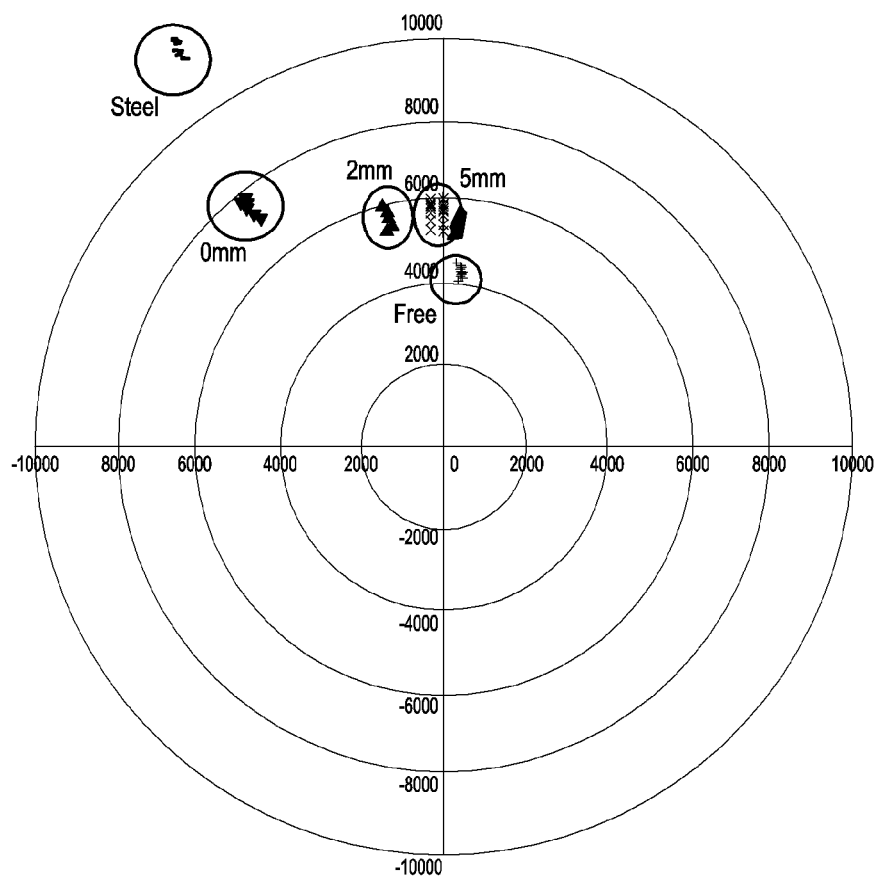
FIG. 10 illustrates data for measuring a type of an adjacent object and a distance from the object on the basis of a voltage of a signal reflected from a first antenna compared to a voltage of a signal input into the first antenna of the electronic device according to various embodiments.
Figure 11:
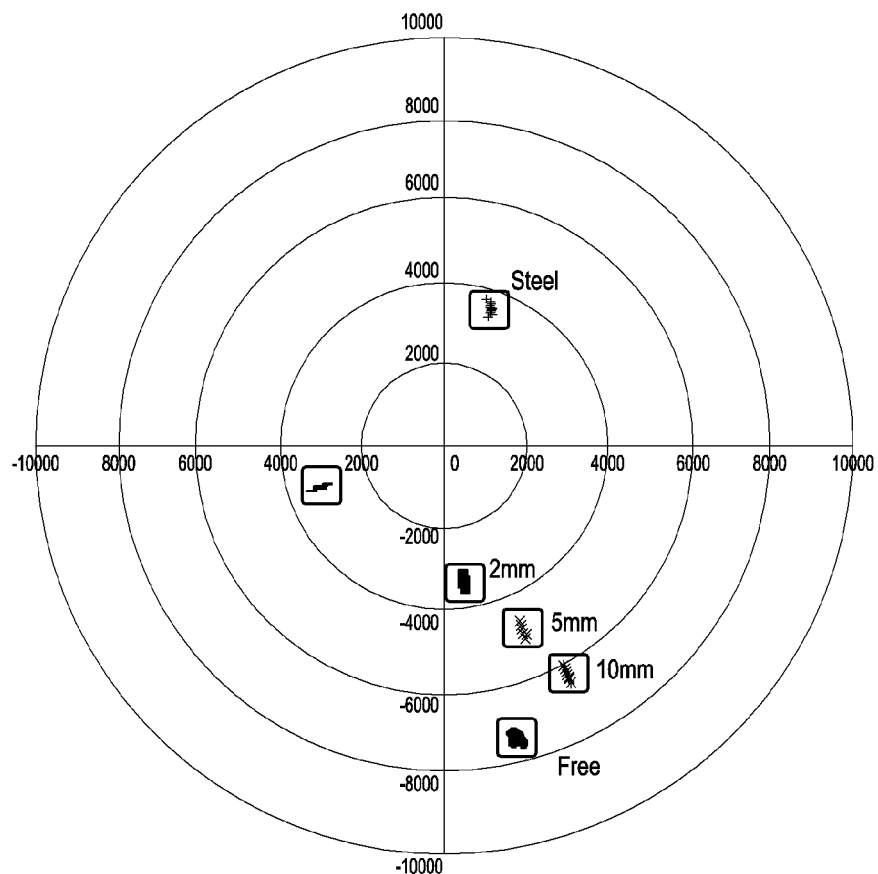
FIG. 11 illustrates data for measuring a type of an adjacent object and a distance from the object on the basis of a voltage of a signal received through a second antenna among signals output through a first antenna compared to a voltage of a signal input into the first antenna of the electronic device according to various embodiments.

FIG. 10 illustrates data for measuring a type of an adjacent object and a distance from the object on the basis of a voltage of a signal reflected through a first antenna compared to a voltage of a signal input into the first antenna of the electronic device according to various embodiments, and FIG. 11 illustrates data for measuring a type of an adjacent object and a distance from the object on the basis of a voltage of a signal received through a second antenna among signals output through the first antenna compared to a voltage of a signal input into the first antenna of the electronic device according to various embodiments.

Referring to FIG. 10, it may be noted that the result of Inverse Synthetic Aperture Radar (ISAR) of 0 to 10 mm for a free space and an iron plate indicates a high frequency in the distance from the iron plate corresponding to about 0 to 5 mm on the basis of, for example, a voltage (for example, S11) of a signal reflected through the first antenna compared to a voltage of a signal input into the first antenna. The type of the object adjacent to the electronic device 101 and the distance from the object may be determined through identification of a reflection coefficient based on the voltage (for example, S11) of the signal reflected through the first antenna compared to the voltage of the signal input into the first antenna. For example, when the distance between the electronic device 101 and the iron plate is 5 mm or more, it may not be easy to distinguish the iron plate from the free space. In this case, a better result may be obtained by identifying a transfer coefficient on the basis of the signal received through the second antenna among the signals output through the first antenna.

Referring to FIG. 11, the type of the object adjacent to the electronic device 101 and the distance from the object may be determined through identification of the transfer coefficient based on the voltage (for example, S21) of the signal received through the second antenna, among the signals output through the first antenna, compared to the voltage of the signal input into the first antenna. For example, it may be noted that the result of the Inverse Synthetic Aperture Radar (ISAR) of 0 to 10 mm for the free space and the iron plate is better than that of FIG. 10. In order to acquire the transfer coefficient between the first antenna and the second antenna, the electronic device 101 according to various embodiments may be designed through various block diagrams illustrated in FIG. 5 and FIGS. 7 to 9. Further, the electronic device 101 may acquire the type of the object and the distance from the object in FIG. 11 more clearly than that in FIG. 10 by obtaining an I value and a Q value corresponding to the voltage (for example, S21) of the signal received through the second antenna, among the signals output through the first antenna.

The invention claimed is:

1. An electronic device comprising:
a first antenna and a second antenna;
a communication circuit comprising a transceiver configured to generate at least one signal, at least one amplifier configured to amplify the generated signal, at least one duplexer configured to distinguish the amplified signals according to communication bands thereof, and at least one coupler configured to radiate the distinguished signals through at least one of the first antenna or the second antenna; and
a processor electrically connected to the first antenna, the second antenna, and the communication circuit,
wherein the processor is configured to:
control the communication circuit to output a first signal through the first antenna and acquire a second signal obtained through reflection of the first signal from the first antenna and a third signal acquired through reception of the first signal, output through the first antenna, through the second antenna,
identify a reflection coefficient obtained through reflection of the first signal from the first antenna and a transfer coefficient obtained through transmission of the first signal to the second antenna, based at least partially on the second signal and the third signal, and
perform a predetermined function according to a value corresponding to a distance between the electronic device and an external object, based at least partially on the reflection coefficient and the transfer coefficient,
wherein the communication circuit further comprises a switch disposed between a first coupler receiving the reflected second signal and a second coupler receiving the third signal and configured to switch at least one of the received second signal or the third signal to be transmitted to the transceiver.

2. The electronic device of claim 1, wherein the processor is configured to perform an operation of adjusting transmission power used for the communication to a predetermined magnitude through a communication module as at least a part of the predetermined function.

3. The electronic device of claim 1, further comprising a memory, wherein the processor is configured to identify a value corresponding to the distance, based on a lookup table stored in the memory.

4. The electronic device of claim 3, wherein the processor is configured to identify at least one of a type of the external object or the distance from the external object, based at least partially on the reflection coefficient and the transfer coefficient.

5. The electronic device of claim 4, wherein the processor is configured to store at least one of the type of the external object or the distance from the external object, identified based at least partially on the reflection coefficient and the transfer coefficient in the lookup table.

6. The electronic device of claim 1, wherein the processor is configured to calculate the reflection coefficient, based on a voltage of the second signal and a voltage of the first signal, and calculate the transfer coefficient, based on a voltage of the third signal and the voltage of the first signal.

7. The electronic device of claim 1, wherein the communication circuit further comprises a first switch configured to switch the third signal and a second switch disposed between the first coupler receiving the reflected second signal and the first switch and configured to switch at least one of the received second signal or the third signal to be transmitted to the transceiver.

8. The electronic device of claim 1, wherein the communication circuit further comprises a first switch configured to switch the second signal output through a first coupler receiving the reflected second signal, a second switch configured to switch the third signal output through a second coupler receiving the received third signal, and a third switch configured to switch signals output from the first switch and the second switch to be transmitted to the transceiver.

9. The electronic device of claim 8, wherein the transceiver comprises a first port configured to acquire the reflected second signal and a second port configured to acquire the reflected third signal, and the third switch comprises a Dual Pole-Dual Throw (DPDT) switch configured to operate to receive the signal output from the first switch and transmit the signal to the first port and to receive the signal output from the second switch and transmit the signal to the second port.

10. The electronic device of claim 8, wherein the third switch comprises switching terminals corresponding to a number of antennas included in the electronic device.

11. An electronic device comprising:
- a first antenna and a second antenna;
- a communication circuit comprising a transceiver configured to generate at least one signal, at least one amplifier configured to amplify the generated signal, at least one duplexer configured to distinguish the amplified signals according to communication bands thereof, and at least one coupler configured to radiate the distinguished signals through at least one of the first antenna or the second antenna; and
- a processor electrically connected to the first and second antennas and the communication circuit, wherein the processor is configured to:
  - output a first signal through the first antenna using the coupler,
  - acquire a second signal reflected through the first antenna and a third signal obtained by reception of the first signal, output through the first antenna, through the second antenna, based on the output first signal,
  - identify a reflection coefficient obtained by reflection of the first signal from the first antenna and a transfer coefficient obtained by transmission of the first signal to the second antenna, based at least partially on the second signal and the third signal, and
  - identify at least one of a type of an external object and a distance from the external object, based at least partially on the reflection coefficient and the transfer coefficient,
- wherein the communication circuit further comprises a switch disposed between a first coupler receiving the reflected second signal and a second coupler receiving the third signal and configured to switch at least one of the received second signal or the third signal to be transmitted to the transceiver.

12. The electronic device of claim 11, wherein the processor is configured to store at least one of the type of the external object or the distance from the external object, identified based at least partially on the reflection coefficient and the transfer coefficient in a lookup table.

* * * * *